US008277912B2

(12) United States Patent
Kuo

(10) Patent No.: US 8,277,912 B2
(45) Date of Patent: Oct. 2, 2012

(54) ORGANIC POLYMER COATINGS FOR WATER CONTAINERS

(75) Inventor: Ming Kuo, Fox Point, WI (US)

(73) Assignee: AOS Holding Company, Wilmington, DE (US)

( * ) Notice: Subject to any disclaimer, the term of this patent is extended or adjusted under 35 U.S.C. 154(b) by 454 days.

(21) Appl. No.: 12/389,190

(22) Filed: Feb. 19, 2009

(65) Prior Publication Data

US 2009/0205742 A1 Aug. 20, 2009

Related U.S. Application Data

(60) Provisional application No. 61/030,118, filed on Feb. 20, 2008.

(51) Int. Cl.

| | |
|---|---|
| ***B29D 22/00*** | (2006.01) |
| ***B29D 23/00*** | (2006.01) |
| ***B32B 1/08*** | (2006.01) |
| ***B32B 15/08*** | (2006.01) |

(52) U.S. Cl. ..................... 428/35.8; 428/34.1; 428/35.7; 428/36.9; 428/36.91; 428/220; 428/457; 222/146.2; 122/13.01; 220/567.3

(58) Field of Classification Search .................. 427/239, 427/181; 142/2; 222/146.2; 122/13.01; 428/34.1, 35.7, 35.8, 36.9, 36.91, 220, 457; 220/567.3

See application file for complete search history.

(56) References Cited

U.S. PATENT DOCUMENTS

| | | | | |
|---|---|---|---|---|
| 3,207,358 | A * | 9/1965 | Fliss | 219/385 |
| 4,099,641 | A | 7/1978 | Schiedat | |
| 4,150,164 | A | 4/1979 | Gerek et al. | |
| 4,191,304 | A | 3/1980 | Schiedat | |
| 4,263,499 | A | 4/1981 | Romance | |
| 4,296,799 | A | 10/1981 | Steele | |
| 4,313,400 | A | 2/1982 | Walker | |
| 4,966,790 | A * | 10/1990 | Iizuka et al. | 427/386 |
| 4,981,112 | A | 1/1991 | Adams | |
| 5,069,956 | A | 12/1991 | Murata et al. | |
| 5,217,140 | A * | 6/1993 | Lindahl | 220/4.06 |
| 5,501,012 | A | 3/1996 | Nogles | |
| 5,522,523 | A | 6/1996 | Nogles | |
| 5,728,423 | A | 3/1998 | Rogerson | |
| 6,061,499 | A | 5/2000 | Hlebovy | |
| 2004/0034154 | A1* | 2/2004 | Tutin et al. | 524/538 |
| 2005/0048218 | A1* | 3/2005 | Weidman | 427/446 |

FOREIGN PATENT DOCUMENTS

| | | | |
|---|---|---|---|
| CN | 1295921 | | 5/2001 |
| CN | 1295921 | A * | 5/2001 |
| DE | 3407777 | | 9/1985 |
| DE | 4012643 | | 12/1990 |
| EP | 1428762 | | 6/2004 |
| EP | 1428762 | A1 * | 6/2004 |
| EP | 1867400 | | 12/2007 |
| FR | 2082593 | | 12/1971 |
| FR | 2506753 | * | 12/1982 |
| JP | 2003232595 | | 8/2003 |

OTHER PUBLICATIONS

Translation of FR2506753.*

Invitation to Pay Additional Fees and Partial International Search for Application No. PCT/US2009/034544 dated Jun. 19, 2009 (5 pages).

International Search Report and Written Opinion for Application No. PCT/US2009/034544 dated Oct. 12, 2009 (15 pages).

Declaration Regarding Information Disclosure Statement signed by Ming Kuo on Apr. 18, 2011.

European Patent Office Action for Application No. 09713079.3 dated Apr. 23, 2012 (6 pages).

* cited by examiner

*Primary Examiner* — Michael C Miggins

(74) *Attorney, Agent, or Firm* — Michael Best & Friedrich LLP

(57) ABSTRACT

Water tanks, such as water heaters, are coated with an organic polymer coating, which coating contacts water during use of the water tank. The organic polymer coatings resist corrosion or blistering when used to store or contain water. The water tanks may be made by treating a metal surface prior to application of the organic polymer coating.

12 Claims, No Drawings

ORGANIC POLYMER COATINGS FOR WATER CONTAINERS

CROSS-REFERENCE TO RELATED APPLICATIONS

This application claims the benefit of priority to U.S. Provisional Application No. 61/030,118, filed Feb. 20, 2008, the entire disclosure of which is hereby incorporated by reference in its entirety.

BACKGROUND

The present invention relates to organic coatings, and particularly, to water-resistant organic polymer coatings for use in water heaters. Porcelain enamel coatings traditionally used in hot water tanks and heaters are subject to corrosion and dissolution by hot water. In a water heater or water tank, once the porcelain enamel coating protecting a metal substrate is dissolved through to the substrate, then the substrate corrodes rapidly and is perforated through. At this point the water heater must be replaced.

SUMMARY

In one aspect, the invention provides a water tank comprising a tank having a water chamber with an interior surface, the interior surface at least partially coated with an organic polymer coating, the coating having a thickness of less than about 375 μm (less than about 15 mil) and adapted to contact water.

In another aspect, the invention provides a method of making a water tank, in which at least a portion of a metal surface of a water tank is treated to create a surface having a profile of about 40 μm to about 100 μm (about 1.6 mil to about 4 mil) and an organic polymer coating is applied to the tank to form a coated surface that contacts water in the water tank.

The invention also provides a method of producing a water tank in which a surface of the tank is treated with a metal phosphate such as zinc phosphate, iron phosphate or manganese phosphate and an organic polymer is applied to the treated surface to form a coated surface that contacts water in the water tank.

In another aspect, the invention provides a method of storing hot water, comprising contacting a tank having at least a portion of its interior surface coated with an organic polymer coating, a portion of the coating contacting water a temperature of at least about 60° C., and showing less than about 1% blistering after a period of at least about 3 months.

DETAILED DESCRIPTION

It is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

All patents, publications and references cited herein are hereby fully incorporated by reference. In case of conflict between the present disclosure and incorporated patents, publications and references, the present disclosure should control.

In one aspect, the present invention relates to water heaters and tanks for storing liquids coated with an organic polymer coating, and methods for making and using the coated water heaters or tanks. The present invention provides at least one of a durable, adhesive, water resistant, pH resistant, chemical resistant and abrasion resistant organic polymer coating for the interior surface of a water tank, such as is used in a water heater. The use of an organic polymer coating on a metal, such as a steel (or a grit-blasted steel) tank permits the water storage tank to be fabricated without the need for firing, so that thinner, less or lower strength metal, such as steel, may be used. Typical glass liners used in water storage tanks tend to dissolve over time when the temperature of the water exceeds about 60° C. (140° F.), particularly when the temperature exceeds about 82° C. (180° F.), or when the pH of the water is at least about 8. The hot water tank coated with the organic polymer coating may be used to store liquids at any pH and at temperatures above about 60° C. (140° F.), about 70° C., about 71.1° C. (160° F.), about 80° C., or about 82.2° C. (180° F.).

The organic coating is applied a hot water tank, or other liquid or water storage tank, directly or indirectly to the surface. In other words, in some embodiments there may be one or more additional layers between the surface and the organic coating. In some embodiments, the organic coating is applied to the interior surface of the tank. In other embodiments, the organic coating is applied to the interior and exterior surfaces of the tank. As used herein "a hot water tank" is a vessel adapted to hold water at a temperature of at least about 55° C. (131° F.) and includes, without limitation, a hot water storage tank, a water heater, such as a direct fired water heater, or a water boiler. The tank is suitably made from a metal, such as steel, which is coated with the organic coating. The organic coatings are suitably applied, for example, to a residential electric or gas water heater or an industrial electric or gas water heater and polymerized. The tank suitably defines or includes a water chamber which is coated with the organic coating, the organic coating being adapted to contact or hold water. Suitably, the water tanks coated with the organic polymer coating are adapted to hold water at a temperature of at least about 55° C., at least about 60° C., at least about 65° C., at least about 70° C., at least about 75° C., at least about 80° C., at least about 85° C., at least about 90° C., at least about 95° C., or at least about 98° C.

Suitably the hot water tank has a capacity of at least about 15 liters, at least about 19 liters (5 gallons), at least about 25 liters, at least about 35 liters, at least about 37.9 liters (10 gallons), at least about 50 liters, at least about 56.9 liters (15 gallons), at least about 75 liters, at least about 75.8 liters (20 gallons), at least about 100 liters, at least about 113.7 liters (30 gallons), at least about 150 liters, at least about 151.6 liters (40 gallons), at least about 175 liters, at least about 189.5 liters (50 gallons), at least about 300 liters, at least about 350 liters, at least about 379 liters (100 gallons) or at least about 400 liters.

In one embodiment, the organic polymer comprises an epoxy polymer base such as bisphenol A epoxy, acrylic modified epoxy, polyester modified epoxy, or a combination thereof. The organic polymer suitably comprises (by weight) at least about 30%, at least about 35%, at least about 40%, at least about 45%, at least about 50%, at least about 55%, at least about 60% and less than about 100%, less than about 95%, less than about 90%, less than about 85% or less than about 80% of the epoxy polymer base. The epoxy polymer base is suitably a reaction product of an epoxide and a dihydroxy compound. Examples of suitable dihydroxy compounds may include bisphenol A, bisphenol F, biphenol, resorcinol. The epoxy polymer base is suitably crosslinked with an anhydride or an epoxy novolac to form the organic polymer. Examples of useful anhydrides may include 1,2,4,5-benzenetetracarboxylic anhydride (PMDA), succinic anhydride, methyl succinic anhydride, tricarballylic anhydride, phthalic anhydride (PTA), hexahydrophthalic anhydride, trimellitic anhydride, itaconic anhydride, and maleic anhydride. Dianhydrides, such as, for example, benzophenone tetracarboxylic dianhydride (3,3',4,4'-benzophenone tetracarboxylic dianhydride; BTDA) commercially available from Chriskev Company, Lenexa, Kans.) or pyromellitic dianhydride, may also be used. Examples of suitable novolac epoxys may include those obtained by reacting phenols such as phenol, o-cresol, m-cresol, p-cresol, p-tert-butylphenol, p-nonylphenol, 2,6-xylenol, resorcinol, bisphenol-A, $\alpha$ and $\beta$-naphthol, and naphthalenediol with aldehydes such as acetaldehyde, formaldehyde, furfural, glyoxal, and p-hydroxybenzaldehyde in the presence of an acid catalyst, or an alkali catalyst to yield a methylolated compound of the corresponding phenol, which is then reacted with phenols in the presence of an acid catalyst. High temperature performance curing agents suitably may be used. Suitably, the curing crosslinking agent is present (by weight) in the organic polymer at least about 1%, at least about 2%, at least about 3%, at least about 5%, at least about 10%, or at least about 15%, and less than about 50%, less than about 45%, less than about 40%, less than about 35%, less than about 30% or less than about 25%.

Suitably, the organic polymer used to coat tanks of the invention may optionally comprise an adhesion promoter, or a cathodic disbondment promoter. The cured organic polymer suitably comprises an epoxy polymer or epoxy resin.

The organic polymer used to coat tanks of the invention may optionally comprise a filler, such as, without limitation, calcium silicate (Wollastonite), calcium carbonate, titanium oxide, micronized silica, an aluminosilicate such as calcined kaolin, a magnesosilicate such as talc and calcium sulfate. Examples of suitable commercially available fillers are Wollastonite Nyad 400 (commercially available from NYCO). The filler is suitably present (by weight) at less than about 70%, less than about 60%, less than about 50%, less than about 40%, less than about 30%, or less than about 20%, and at least about 0.5%, at least about 1%, at least about 1.5%, and at least about 5%, or and at least about 10% of the organic polymer.

The organic polymer used to coat tanks of the invention may optionally comprise a flow control agent. Suitable flow control agents include, without limitation, acrylic flow agents (polyacrylates), silicone oligomers, fluorinated polyolefins, polyvinyl butyral, and combinations thereof. An example of suitable flow agents are the Resiflow series (such as Resiflow p-67), commercially available from Estron Chemical, Calvert City, Ky. The flow control agent is suitably present (by weight) at less than about 10%, less than about 0.7%, or less than about 5%, and at least about 0.1%, at least about 0.2%, or at least about 0.5% of the organic polymer.

The organic polymer used to coat tanks of the invention may optionally comprise a catalyst. Suitable catalysts may include, without limitation, tin catalysts such as stannous octoate and tetraphenyl tin, zinc metal, dibutyltin dilaurate, potassium acetate, potassium octoate, isocyanate trimerization catalyst, dibutyltin mercaptide, dibutyltin thiocarboxylates, phenylmercuric propionate, lead octoate, and ferric acetylacetonate. The catalyst is suitably present (by weight) at less than about 10%, less than about 7.5%, or less than about 5%, and at least about 0.1%, at least about 0.25%, or at least about 0.5% of the organic polymer.

The organic polymer used to coat tanks of the invention may optionally comprise a pigment. Suitable pigments having yellow colors may include C. I. Pigment Yellow 1, 2, 3, 4, 5, 6, 7, 10, 11, 12, 13, 14, 15, 16, 17, 19, 65, 74, and 83 and Solvent Yellow 33. Those having red colors may include, for example, C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 49, 50, 51, 52, 53, 55, 60, 64, 83, 87, 88, 89, 90, 112, 114, 122, 123, and 163. Those having blue colors may include, for example, C. I. Pigment Blue 2, 3, 15, 16, 22, and 25. Those having black colors may include, for example, C. I. Pigment Black 1 and 7, and carbon black (commercially available from Degussa AG, Germany). The pigment is suitably present (by weight) at less than about 50%, less than about 40%, less than about 30%, or less than about 20%, and at least about 0.5%, at least about 1%, at least about 1.5%, or at least about 2% of the organic polymer.

Organic polymer coatings of the invention may be stable over a wide range of different pHs. For example, the organic polymer coating may resist corrosion or blistering when the pH of the liquid contained in it over a period about 1 month, about 3 months, about 4 months, about 6 months, about 9 months, about 12 months, about 2 years, about 5 years or about 10 years is at least about 1 (or about 1), at least about 2 (or about 2), is at least about 3 (or about 3), at least about 4 (or about 4), at least about 5 (or about 5), at least about 6 (or about 5), or at least about 7, (or about 7) and is less than about 14 (or about 14), less than about 13 (or about 13), less than about 12 (or about 12), less than about 11 (or about 11), less than about 10 (or about 10), less than about 9 (or about 9), or less than about 8 (or about 8). Suitably, the organic polymer coating resists corrosion and/or blistering over the aforementioned pH values, or when contacted with water, for the aforementioned periods of time when the temperature of the liquid is at least about 20° C., at least about 30° C., at least about 40° C., at least about 50° C., at least about 60° C., at least about 65° C., at least about 70° C., at least about 75° C., at least about 80° C., at least about 82° C., at least about 85° C., at least about 88° C., at least about 90° C., at least about 95° C., at least about 98° C., or at least about 99° C. Resistance to corrosion and/or blistering over pH ranges of about 1 to about 14 or about 2 to about 13 are contemplated. Suitably, the organic polymer coating resists corrosion and blistering when exposed to boiling water for a period of 6,000 to 9,000 hours. As used herein "resists corrosion or blistering," means that no blisters or corrosion of the coating are visually evident after the specified test conditions. Suitably less than about 10%, less than about 7%, less than about 5%, less than about 4%, less than about 3%, less than about 2%, less than about 1%, less than about 0.5%, less than about 0.1%, less than about 0.01%, less than about 0.001%, or less than about 0.0001% of the surface area of the organic polymer coating contacting the liquid (or otherwise exposed to the conditions) is blistered or shows blistering after the specified test conditions and specified time periods described herein.

Conditions for testing corrosion and/or blistering, include, for example, exposure to a water immersion test at about 60° C. (140° F.), about 71° C. (160° F.), about 82° C. (180° F.), about 93° C. (200° F.), about 96° C. (205° F.), exposure to salt spray testing (for example, ASTM B117 testing) for 9,000 hours or 10,000 hours, exposure to methyl ethyl ketone, xylene and methylene chloride for a period of nine months (or 5,000 hours), or exposure to water at a temperature of about 71.1° C. (160° F.) about 82.2° C. (180° F.), or about 87.8° C. (190° F.). For example, the corrosion, blistering and or degradation of coatings may be monitored using hot water test cells with a water temperature of at least about 55° C., at least about 60° C., at least about 65° C., at least about 70° C., at least about 75° C., at least about 80° C., at least about 85° C., at least about 90° C., at least about 95° C., at least about 98° C., or at least about 99° C. for a period of at least about 50 hours, at least about 100 hours, at least about 200 hours, at least about 400 hours, at least about 800 hours, at least about 1,000 hours, at least about 3,000 hours, at least about 4,000 hours, at least about 5,000 hours, at least about 8,000 hours, at least about 9,000 hours, or at least about 10,000 hours. Organic polymer coatings of the invention suitably resist corrosion and blistering when subjected to high humidity (RH 95%) or water immersion tests. For example, corrosion and/or blistering may be monitored by performing a water immersion test of 10,000 hours at 82° C. (180° F.), 6,000 hours at 96.1° C. (205° F.), or 4,000 hours at 100° C. (212° F.). Organic polymer coatings of the invention suitably resist corrosion or blistering under one or more of these conditions.

Organic polymer coatings of the invention suitably show excellent chemical resistance. For example, the coatings may resist corrosion and blistering when exposed to a 10% sodium hydroxide solution or a 10% sulfuric acid solution for 6,000 to 9,000 hours at 82.2° C. (180° F.), a 50% sulfuric acid solution for 9000 hours at 82.2° C. (180° F.), a 50% sodium hydroxide solution for 9,000 hours at 82.2° C. (180° F.). The organic polymer coatings when applied to a water tank also suitably resist corrosion and/or blistering after exposure to hydrofluoric acid (such as a 50% aqueous solution of HF) or gluconic acid for a period of at least about 1 month, at least about 3 months, at least about 6 months, at least about 9 months, at least about 12 months, at least about 15 months, at least about 18 months, or at least about 24 months.

Organic polymers useful in the invention may have high glass transition temperatures (Tg). For example, the polymer may have a Tg of at least about 80° C., at least about 85° C., at least about 90° C., at least about 95° C., at least about 100° C., at least about 105° C., at least about 110° C., at least about 115° C., at least about 120° C., at least about 130° C., at least about 140° C., at least about 145° C., or at least about 150° C.

Organic polymer coatings of the invention show good adhesion to the substrate, such as a water tank, water heater, hot water storage tank, or boiler. For example, the organic polymer coating may adhere well to metal surfaces such as those containing, without limitation, steel (including standardized steel and/or galvanized steel), iron, titanium, aluminum or magnesium. While thicker steel (such as steel having a thickness of at least about 1.5 mm, at least about 1.6 mm, at least about 1.75 mm, or at least about 1.9 mm) may be used to fabricate the substrate, such as a water tank, water heater, hot water storage tank, or boiler, thinner steel may also be suitably used. For example, steel having a thickness of less than about 1.5 mm, less than about 1.4 mm, less than about 1.3 mm, less than about 1.25 mm, less than about 1.2 mm, less than about 1.1 mm, less than about 1 mm, less than about 0.9 mm, less than about 0.8 mm, less than about 0.7 mm, or less than about 0.6 mm may be used. For example, for a 50-gallon (190 liter or 200 liter) tank, steel having a thickness of less than about 1.5 mm, less than about 1.25 mm less than about 1.2 mm, less than about 1.1 mm or less than about 1 mm may be used. For a 10-gallon (about a 40 liter or less) tank, for example, steel having a thickness of less than about 1 mm, less than about 0.9 mm, less than about 0.8 mm, less than about 0.7 mm, or less than about 0.6 mm may be used. For a tank of at least an about 100 liters (or about 30-gallon) capacity, steel having a thickness of less than about 1.4 mm, less than about 1.3 mm, less than about 1.25 mm less than about 1.2 mm, less than about 1.1 mm or less than about 1 mm may be used.

In one embodiment, adhesion to the substrate is facilitated by pre-treating the surface of the substrate by cleaning and/or profiling the surface. Substrates, such as fabricated tank components, may be cleaned using any suitable technique known in the art. For example, fabricated tanks or tank components may be cleaned using single-stage or multiple-stage washers (such as two-stage, three-stage, four-stage or five-stage washers). Cleaning agents than may be used include, without limitation, mild acid cleaners, neutral cleaners, alkaline cleaners, or organic cleaners such as acetone and ethanol.

The substrate may be surface treated or modified to facilitate adhesion of the organic polymer coating or coating components. For example, steel or other substrate may be phosphate-treated (e.g. with iron-phosphate, zinc-phosphate or manganese phosphate), etched with acid (for example immersed in gluconic acid for one minute or longer), shot blasted, grit blasted, sand blasted, or cold-rolled before being coated with the organic polymer. The blasting treatment may be carried out to produce a metal surface that is white in appearance. The surface may be treated to have a profile (i.e. the depth of the texture on the surface) of about 50 μm (2 mils). Suitably, the profile of the treated surface is at least about 10 μm, at least about 20 μm, at least about 25 μm, at least about 30 μm, at least about 35 μm, at least about 40 μm, or at least about 45 μm. Suitably, the profile of the treated surface is less than about 150 μm, less than about 140 μm, less than about 130 μm, less than about 120 μm, less than about 110 μm, less than about 100 μm, less than about 90 μm, less than about 80 μm, less than about 75 μm, less than about 70 μm, less than about 65 μm, less than about 60 μm, or less than about 55 μm. The blasting surface treatment may provide a controlled profile with substantially no contaminating chemical residues (for example, as might be left from inadequate rinsing, etc). Chemical residues left on surfaces may interfere with the functioning of the organic polymer coating, and potentially cause early failures. In one embodiment, the organic polymer is applied to the treated or blasted surface within about 24 hours, within about 12 hours, within about 8 hours, within about 4 hours, within about 3 hours, within about 2 hours, within about 1 hour, within about 45 minutes, within about 30 minutes, within about 20 minutes, within about 15 minutes, within about 10 minutes, within about 5 minutes, or within about 3 minutes of completion of the treatment or blasting, such that oxidation of the surface is minimized. Suitably, the humidity is controlled and the steel is maintained under inert conditions following the surface treatment and prior to applying the organic coating to prevent or reduce oxidation of the treated surface. Suitably, less than about 50%, less than about 45%, less than about 40%, less than about 35%, less than about 30%, less than about 25%, less than about 20%, less than about 15%, less than about 10%, less than about 5%, less than about 3%, less than about 2%, less than about 1%, less than about 0.5%, less than about 0.1%, less than about 0.1% or less than about 0.01% of the surface is oxidized prior to applying the organic coating.

For metal (e.g. zinc, iron, manganese) phosphate treatment, the tank or tank components may be cleaned using hot alkaline cleaner, rinsed, and chemically conditioned to prepare for zinc, iron or manganese phosphate. The metal phosphate is then added before excess is rinsed away using one or more rinses which may include a deionized water rinse and/or a sealing rinse. The metal phosphate treatment results in crystals layered, deposited or grown on the substrate surfaces. These crystals may have a needle-like appearance and create profiles for better coating adhesion. When electro-coating is used to coat the component with the polymer, a hydrogen bond may form between the organic polymer and the metal phosphate. When powder coating is used to coat the component with the polymer, the crystals provide mechanical adhesion of the coating.

When the coating components are in powder form, the organic polymer coating may be formed, for example, by powder coating the inside of the tank and heating the tank to form the coating, or otherwise curing the coating components to form the organic polymer coating. When the coating components are in liquid form, the coating may be formed by dipping the tank into the coating components such that the coating forms on the interior and exterior surface of the tank. Suitable methods for applying the organic polymers to the tank may include those known in the art, such as spraying, pouring and painting. Electrocoating may also be used.

The organic polymer coating may be cured or set onto the water tank at a temperature of less than about 200° F. (or about 95° C.), less than about 300° F. (or about 150° C.), less than about 400° F. (or about 205° C.), less than about 500° F. (or about 260° C.), less than about 600° F. (or about 315° C.), less than about 700° F. (or about 370° C.), less than about 800° F. (or about 425° C.), less than about 900° F. (or about 485° C.), less than about 1000° F. (or about 540° C.), less than about 1200° F. (or about 650° C.), less than about 1400° F. (or about 760° C.), or less than about 1600° F. (or about 870° C.).

In one embodiment, the coating is cured or set at a temperature of at least about 175° C., at least about 185° C., at least about 190° C., at least about 195° C., or at least about 200° C. and less than about 260° C., less than about 255° C., less than about 250° C., less than about 245° C., less than about 240° C., less than about 235° C., or less than about 225° C. for a period of time of at least about 2 minutes, at least about 5 minutes, at least about 7 minutes or at least about 10 minutes, and less than about one hour, less than about 45 minutes, less than about 40 minutes, less than about 35 minutes or less than about 30 minutes. For example, the coating may be cured at a temperature of about 185° C. to about 260° C. for between about 5 and about 30 minutes.

In one embodiment, the organic coating adheres to the inner or interior surface of the tank and suitably forms a contiguous layer. In another embodiment the organic coating adheres to the inner (or interior) and outer (or exterior) surface of the tank, and suitably forms a contiguous layer over both inner (or interior) and outer (or exterior) surfaces. The tank may therefore suitably contain a single layer or film of the coating. The coating is adapted to contact water, and may suitably regularly contact water. As used herein, "contacting water," means that a least a portion of coating is in contact with a volume of at least 0.5 liters of water contained or stored in the tank. As used herein, "regularly contacting water," means that at least a portion of the coating contacts water for a majority of time over the functional life span of the tank.

The coating formed on the tank is suitably less than about 500 μm (20 mil), less than about 400 μm (16 mil), less than about 375 μm (15 mil), less than about 350 μm (14 mil), less than about 300 μm (12 mil), less than about 250 μm (10 mil), less than about 200 μm (8 mil), less than about 175 μm (7 mil), less than about 150 μm (6 mil), less than about 125 μm (5 mil), or less than about 100 μm (4 mil), less than about 75 μm (3 mil), or less than about 50 μm (2 mil) in thickness. The coating formed on the tank may be at least about 25 μm (1 mil), at least about 50 μm (2 mil), at least about 75 μm (3 mil), or at least about 100 μm (4 mil) in thickness.

The following examples are illustrative and are not to be construed as limiting the scope of the invention.

EXAMPLES

Example 1

A one flat-panel storage tank was coated with a coating of the invention to test the integrity of the coating. The tank was used to store pig manure. The integrity of the coating was inspected every three months. No compromise in integrity was detected after two years of testing.

Example 2

Twelve 50 gallon gas water heaters fabricated from steel at a customary steel thickness were hand cleaned with acetone. The organic polymer components described in Example 4 (Table 1) were used to powder coat the interior surface of the tanks. The tanks were heated to form the coatings. The coatings had a thickness of between 25 μm and 125 μm (1 to 5 mil).

No corrosion or degradation of the coating was seen when the tanks were used to heat water and store hot water over a period of 3 months.

Example 3

Ten 20 gallon electric water heaters fabricated from steel at a customary steel thickness were cleaned using a glassing line washer. The organic polymer components described in Example 4 (Table 1) were used to powder coat the interior surface of the tanks. The tanks were heated to form the coatings. The coatings had a thickness of between about 25 μm and 100 μm (1 to 4 mil).

No corrosion or degradation of the coating was seen when the tanks were used to heat water and store hot water over a period of 2 months.

Example 4

An organic polymer in the form of a powder was made using the components listed in Table 1. The coating had a glass transition temperature of at least 121° C. (250° F.) and was applied to water heaters. The coating performed well in tests.

TABLE 1

| Component | Amount (by weight) |
|---|---|
| Bis Phenol A: Eppikote 1002 (commercially available from Hexion Specialty Chemical) | 70% |
| Bis Phenol A: Eppikote 1007 (commercially available from Hexion Specialty Chemical) | 5% |
| Wollastonite NYAD 400 ® (Calcium silicate; commercially available from NYCO) | 2.5% |

TABLE 1-continued

| Component | Amount (by weight) |
|---|---|
| BTDA (benzophenone tetradicarboxylic acid dianhydride; commercially available from Chriskev Co.) | 15% |
| Resiflow p-67 (flow agent; commercially available from Estron Chemical) | 0.75% |
| Benzoin (commercially available from GCA Chemical, Bradenton, FL) | 1.0% |
| Octaflow ST-70 (stannous octoate; commercially available from Estron Chemical and GCA Chemical, Bradenton, FL) | 0.75% |
| Carbon black (pigment; commercially available from Degussa AG) | 5% |

Example 5

An organic polymer of the invention was used to coat steel and was tested using hot water corrosion cells. Conditions tested included 93.3° C. (200° F.) (½ filled to create vapor phase) for 72 hours; boiling for 800 hours; 82.2° C. (180° F.) for 3200 hours, and 71.1° C. (160° F.) for 3200 hours. No blistering or corrosion was observed under any of these tested conditions.

Example 6

The organic polymer of Example 4 (Table 1) was applied to water heaters: 10-gallon capacity electric heaters, 50-gallon capacity electric heaters and 30 gallon capacity gas heaters were each tested.

Ten-gallon capacity steel tanks were fabricated by processing steel coil though an uncoiling/straightening line and then through a blaster. Tank and head blanks were cut and processed through a stamping operation. Top heads were washed and tank shells were welded. Spuds were then welded onto top heads and tank shells. The tank shell was expanded and the head was pressed into the tank shell. The head was then welded onto the shell.

The fabricated steel water tanks were cleaned at ambient temperature with 2% volume of a commercially available neutral cleaner at a pH of 7-8, with 2 satiations, using a three-stage washer facility. The cleaned tanks were dried off at temperatures of 121.1° C. (250° F.) and higher using oven facilities having a high volume air movement.

The interiors of the tank assembly were grit blasted in a blast cabinet using steel grit (for some 50 gallon tanks) or 24 grit aluminum oxide (10-gallon tanks and other 50-gallon tanks) to produce a 50 μm (2.0 mils) profile. The dust, shots and grits following the blasting were blown off using compressed air to reveal surfaces having a white metal appearance.

Within 5 minutes of preparing the metal by grit blasting, the organic polymer powder listed in Table 1 was spray applied to a 4 to 6 mil (about 100 to 150 μm) thickness. The powder coated components were cured by baking at an oven temperature of 420° F. (215° C.) for 20 minutes (or to a metal temperature of 400° F. (204° C.) for 10 minutes) to produce a coating thickness of about 5 mils (about 125 μm) or 4 to 6 mils (about 100 to 150 μm).

No corrosion or degradation of the coating was seen (no blisters were evident on the surface of the coatings) when the tanks were used to heat water and store hot water over a period of three years at a water temperature of 160° F. (71.1° C.), with six draws of 6 to 10 gallons from each tank (i.e. the tanks were emptied and refilled with 6 to 10 gallons of water six times) per 24 hour period during the three year test period.

Example 7

Steel water heaters (ten-gallon capacity electric heaters and 50-gallon capacity electric heaters) were coated with a polymer using the process detailed in Example 6, except that the polymer contained the components listed in Table 2 instead of the components listed in Table 1. The coating had a glass transition temperature of at least 121° C. (250° F.).

TABLE 2

| Component | Amount (by weight) |
|---|---|
| Bis Phenol A: Eppikote 1002 (commercially available from Hexion Specialty Chemical) | 70% |
| Bis Phenol A: Eppikote 1007 (commercially available from Hexion Specialty Chemical) | 5% |
| Wollastonite NYAD 400 ® (Calcium silicate; commercially available from NYCO) | 2.5% |
| BTDA (benzophenone tetradicarboxylic acid dianhydride; commercially available from Chriskev Co.) | 15% |
| Resiflow p-67 (flow agent; commercially available from Estron Chemical) | 0.75% |
| Benzoin (commercially available from GCA Chemical, Bradenton, FL) | 1.0% |
| Octaflow ST-70 (stannous octoate; commercially available from Estron Chemical and GCA Chemical, Bradenton, FL) | 0.75% |
| Iron Oxide (Yellow pigment) | 5% |

No corrosion or degradation of the coating was seen (no blisters were evident on the surface of the coatings) when the tanks were used to heat water and store hot water over a period of three years at a water temperature of 160° F. (71.1° C.), with six draws of 6 to 10 gallons from each tank over each 24 hour period during the three year test period.

Example 8

Six 30-gallon capacity steel gas water heaters were coated with Henkel AQUENCE™ 930 (an epoxy-acrylic urethane mixture commercially available from the Henkel Corporation), by dipping the heaters into the Henkel AQUENCE™ 930.

No blisters were visually evident after the tanks were used to heat water and store hot water over a period of three months at a water temperature of 160° F. (71.1° C.), with six draws of 6-10 gallons from each tank over each 24 hour period during the three month test period.

Example 9

Standard steel test panels were cleaned with hot alkali, rinsed, and subjected to chemical conditioning to prepare for zinc phosphate. Zinc phosphate was deposited on the panels such that needle like crystals grew on the surface. The panels were rinsed, followed by a deionized water rinse, and a sealing rinse.

The zinc phosphate crystals created a profile on the metal panels for better adhesion of the organic polymer coating. The organic polymer of Example 4 (Table 1) was used to coat the panels. No blistering or corrosion of the coating (no blisters were noted on the surface of the coating) was noted after the coated panels were immersed in water at temperatures of 160° F. (71.1° C.), 180° F. (82.2° C.), or 194° F. (90° C.) for 4,000 hours.

What is claimed is:

1. A water heater comprising a metal tank, the metal tank comprising a water chamber having an interior surface, the interior surface at least partially coated with an organic epoxy-containing polymer coating, the epoxy-containing polymer coating having a thickness of less than about 375 μm, a Tg value of at least 120° C. and adapted to regularly contact water contained in the water heater.

2. The water heater of claim 1, wherein the water heater is a direct-fired water heater.

3. The water heater of claim 1, wherein the water heater is a residential electric water heater, a residential gas water heater, an industrial electric water heater or an industrial gas water heater.

4. The water heater of claim 1, wherein the epoxy polymer is crosslinked with tetradicarboxylic acid dianhydride.

5. The water heater of claim 1, wherein the polymer has a glass transition temperature of at least about 130° C.

6. The water heater of claim 1, wherein the coating has a thickness of at least about 75 μm and less than about 350 μm.

7. The water heater of claim 1, wherein the interior surface has a profile of at least about 40 μm and less than about 100 μm on which the organic polymer is coated.

8. The water heater of claim 1, wherein less than about 1% of the surface area of the organic polymer coating is blistered after immersion in water at a temperature of about 82° C. for 6 months.

9. The water heater of claim 1, wherein the metal tank comprises steel.

10. The water heater of claim 9, wherein the tank has a capacity of at least about 100 liters and the steel has a thickness of less than about 1.25 mm.

11. A water heater comprising a metal tank, the metal tank comprising a water chamber having an interior surface, the interior surface at least partially coated with a single layer organic polymer coating, the coating having a thickness of less than about 375 μm, a Tg value of at least 120° C. and adapted to regularly contact water contained in the water heater.

12. A water heater comprising a metal tank, the metal tank comprising a water chamber having an interior surface, the interior surface at least partially coated with an organic polymer coating comprising an epoxy polymer, the coating comprising the epoxy polymer being innermost to the chamber, having a thickness of less than about 375 μm, a Tg value of at least 120° C. and adapted to regularly contact water contained in the water heater.

* * * * *